US012321442B2

(12) United States Patent
Maiman et al.

(10) Patent No.: US 12,321,442 B2
(45) Date of Patent: *Jun. 3, 2025

(54) FAVORITE MERCHANTS SELECTION IN TRANSACTION BASED AUTHENTICATION

(71) Applicant: Capital One Services, LLC, McLean, VA (US)

(72) Inventors: Tyler Maiman, Melville, NY (US); David Septimus, New York, NY (US); Daniel Miller, Brooklyn, NY (US); Samuel Rapowitz, Roswell, GA (US); Jenny Melendez, Falls Church, VA (US); Viraj Chaudhary, Katy, TX (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,389

(22) Filed: Apr. 23, 2024

(65) Prior Publication Data

US 2024/0273178 A1    Aug. 15, 2024

Related U.S. Application Data

(63) Continuation of application No. 17/495,365, filed on Oct. 6, 2021, now Pat. No. 11,995,175.

(51) Int. Cl.
*G06F 21/45* (2013.01)
*G06N 3/04* (2023.01)

(52) U.S. Cl.
CPC .............. *G06F 21/45* (2013.01); *G06N 3/04* (2013.01); *G06F 2221/2103* (2013.01)

(58) Field of Classification Search
None
See application file for complete search history.

(56) References Cited

U.S. PATENT DOCUMENTS

| 8,745,698 B1 | 6/2014 | Ashfield et al. |
| 2009/0106134 A1 | 4/2009 | Royyuru |

(Continued)

OTHER PUBLICATIONS

Top 100 Retailers 2019, <<https://nrf.com/resources/top-retailers/top-100-retailers/top-100-retailers-2019>>, date of publication unknown but, prior to Jun. 7, 2021, 7 pages.

(Continued)

*Primary Examiner* — William J. Goodchild
(74) *Attorney, Agent, or Firm* — Banner & Witcoff, Ltd.

(57) ABSTRACT

Methods, systems, and apparatuses are described herein for improving computer authentication processes through presenting favorite merchants selection in transaction-based authentication. A computing device may receive a request for access to an account associated with a user. The computing device may train a machine learning model to determine predicted favorite merchant information, and provide one or more transactions conducted by the user as input to the trained first machine learning model. Data indicating favorite merchant information may be received from the trained first machine learning model. An authentication question may be generated and a candidate response to the authentication question may be received. Based on the candidate response, access to the account may be provided.

20 Claims, 8 Drawing Sheets

(56) References Cited

U.S. PATENT DOCUMENTS

| | | | |
|---|---|---|---|
| 2020/0184050 A1* | 6/2020 | Toth | G06F 21/32 |
| 2020/0357049 A1* | 11/2020 | O'Connor | G06Q 40/02 |
| 2021/0065185 A1 | 3/2021 | Krishnanand et al. | |

OTHER PUBLICATIONS

The Most Popular Department Stores (Q1 2021), Consumer, YouGov Ratings, <>https://today.yougov.com/ratings/consumer/popularity/department-stores/all>>, date of publication unknown but, prior to Jun. 7, 2021, 5 pages.

Dwivedi, et al., "Challenges and Best Practices in KBA Schemes," 2015 EMC Proven Professional Knowledge Sharing, date of publication unknown but, prior to Jun. 7, 2021, <<https://education.emc.com/content/dam/dell-emc/documentsen-us/2015KS_Dwivedi-Challenges_and_Best_Practices_in_KBA_Schemes>>, 17 pages.

Dynamic KBA< IDology, ExpectID® IQ, <<https://www.idology.com/dynamic-kba/>>, date of publication unknown but, prior to Jun. 7, 2021, 9 pages.

Dynamic KBA—The Best Security Questions, Identify Management Blog, <<https://www.identropy.com/blog/iam-blog/bid/110793/dynamic-kba-the-best-security-questions>>, date of publication unknown but, prior to Jun. 7, 2021, 4 pages.

Jan. 22, 2018, Baukes, "Everybody Knows: How Knowledge-Based Authentication Died," Forbes Technology Council Post, <<https://www.forbes.com/sites/forbestechcouncil/2018/01/22/everybody-knows-how-knowledge-based-authentication-died/?sh=4441a6c94eee>>, 5 pages.

Aug. 29, 2018, Hearn, "Answering My Own Authentication Questions Prove That They're Useless," Alloy, <<https://alloy.com/blog/answering-my-own-authentication-questions-prove-that-theyre-useless, 8 pages.

Anas Ibrahim et al. "Innovative Data Authentication Model" 2016 IEEE 7th Annual Information Technology, Electronics and Mobile Communication Conference (IEMCON), IEEE, Oct. 13, 2016, pp. 1-7, XP033009797, DOI: 10.1109/IEMCON.2016.7746268.

Jan. 13, 2023—(WO) International Search Report and Written Opinion—App No. PCT/US2022/045799.

\* cited by examiner

Favorite Merchants from January to June:

Realfoods

Joe's Grocery

Fredmans

Sureway

Favorite Merchants
(601)

Least Favorite Merchants from January to June:

Jill's Organic Market

Audee

Harry T

Grand's

Least Favorite merchants
(602)

FIG. 6A

FAVORITE MERCHANTS SELECTION IN TRANSACTION BASED AUTHENTICATION

CROSS-REFERENCE TO RELATED APPLICATIONS

This application is a continuation of and claims priority to co-pending U.S. patent application Ser. No. 17/495,365 filed on Oct. 6, 2021, and titled "Favorite Merchants Selection in Transaction Based Authentication," the contents of which are incorporated in its entirety.

FIELD OF USE

Aspects of the disclosure relate generally to account security. More specifically, aspects of the disclosure may provide for improvements in the method in which authentication questions are generated by computing devices by processing transaction and merchant information.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth location, etc.), and that information may be used to generate an authentication question (e.g., "Where were you born, and in what year?"). A potential downside of these types of authentication questions is that the correct answers may be obtainable and/or guessable for someone who has information about a particular user.

As part of authenticating a computing device, information about financial transactions conducted by a user of that computing device may be used to generate authentication questions as well. For example, a user may be asked questions about one or more transactions conducted by the user in the past (e.g., "Where did you get coffee yesterday?," "How much did you spend on coffee yesterday?," or the like). Such questions may prompt a user to provide a textual answer (e.g., by inputting an answer in a text field), to select one of a plurality of answers (e.g., select a single correct answer from a plurality of candidate answers), or the like. In some instances, the user may be asked about transactions that they did not conduct. For example, a computing device may generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user may be able to glean personal information about the legitimate user.

One issue with transaction-based authentication questions is that they might relate to transactions that are not particularly memorable to a user. For example, some users might conduct regular small transactions throughout the day that they might not remember, such that those users might not be able to easily and/or accurately answer authentication questions based on those transactions. This may particularly be the case for merchants that a user visits occasionally, as such merchants might not be particularly memorable to a user. As such, an authorization process can become frustrating and time-consuming for a user and can waste significant amounts of computing resources.

Aspects described herein may address these and other problems, and generally enable a user to be verified in a more reliable and robust manner, thereby improving the safety of financial accounts and computer transaction systems and the user experience during the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to using a user's favorite merchants to be presented in an authentication question. These favorite merchants may be based on a user's transaction history and/or additional information not readily identified in the transaction history. Including the favorites merchants in the authentication questions may increase memorability, promote account accessibility to the users, and better protect their accounts from unauthorized access. As will be described in greater detail below, this process is effectuated by identifying the favorite merchants for a user using a machine learning model, which may be trained using transaction records related to numerous users and other information such as a user's geographic location and demographic information. Likewise, a user's least favorite merchants may also be presented in an authentication question to minimize confusions and increase account accessibilities in the user community.

More particularly, and as will be described further herein, a computing device may receive, from a user device, a request for access to an account associated with a user. The computing device may receive, from a transactions database, transactions data corresponding to the account. The transactions data may indicate one or more transactions conducted by the user. The computing device may train a first machine learning model to determine predicted favorite merchant information associated with a plurality of different users. The first machine learning model may be trained based on a history of transaction records by the plurality of different users. The computing device may provide, as input to the trained first machine learning model, the one or more transactions conducted by the user. The computing device may receive, from the trained first machine learning model, data indicating favorite merchant information associated with the user. The computing device may generate, based on the data indicating the favorite merchant information, an authentication question, and provide the authentication question to the user device. The computing device may receive, from the user device, a response to the authentication question. Accordingly, the computing device may provide the user device access to the account based on the response to the authentication question.

In many aspects, the computing device may train a first machine learning model based on a frequency and a payment amount for a particular merchant. The computing device may determine favorite merchant information based on the frequency and the payment amount for the particular merchant associated with a user, or a user's spending pattern. The spending pattern may indicate a total expenditure on a payment card for a predetermined period of time.

In many aspects, the computing device may determine least favorite merchant information associated with the user based on the one or more transactions conducted by the user. The computing device may generate the authentication question based on the least favorite merchant information. The computing device may determine a geographic area associated with the user based on the one or more transactions conducted by the user, and the computing device may generate the least favorite merchant information based on the geographic area. For example, the computing device may detect a merchant that is proximately located to the user based on the user's geographic area. The computing device may further detect that the user has not conducted any transaction with the merchant based on the one or more transactions conducted by the user. As such, the computing device may generate the least favorite merchant information comprising the merchant.

The computing device may train a second machine learning model with a scoring matrix associated the favorite merchant information. The trained second machine learning model may generate an output indicating whether to provide the user device access to the account. The computing device may provide, as input to the trained second machine learning model, the response to the authentication question. The computing device may receive, from the trained second machine learning model and based on the scoring matrix, authentication data to determine whether to provide the user device access to the account. For example, the scoring matrix may include a score assigned to each candidate merchant in the authenticate question. A likelihood that the user will correctly identify each merchant comprised in the favorite merchant information may be determined. The second machine learning model may assign, based on the likelihood, a weight factor associated with each merchant comprised in the favorite merchant information. The computing device may provide, based on the response to the authentication question and the weight factor, the user device access to the account.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A illustrates illustrative favorite merchants and least favorite merchants.

DETAILED DESCRIPTION

Figure 1:
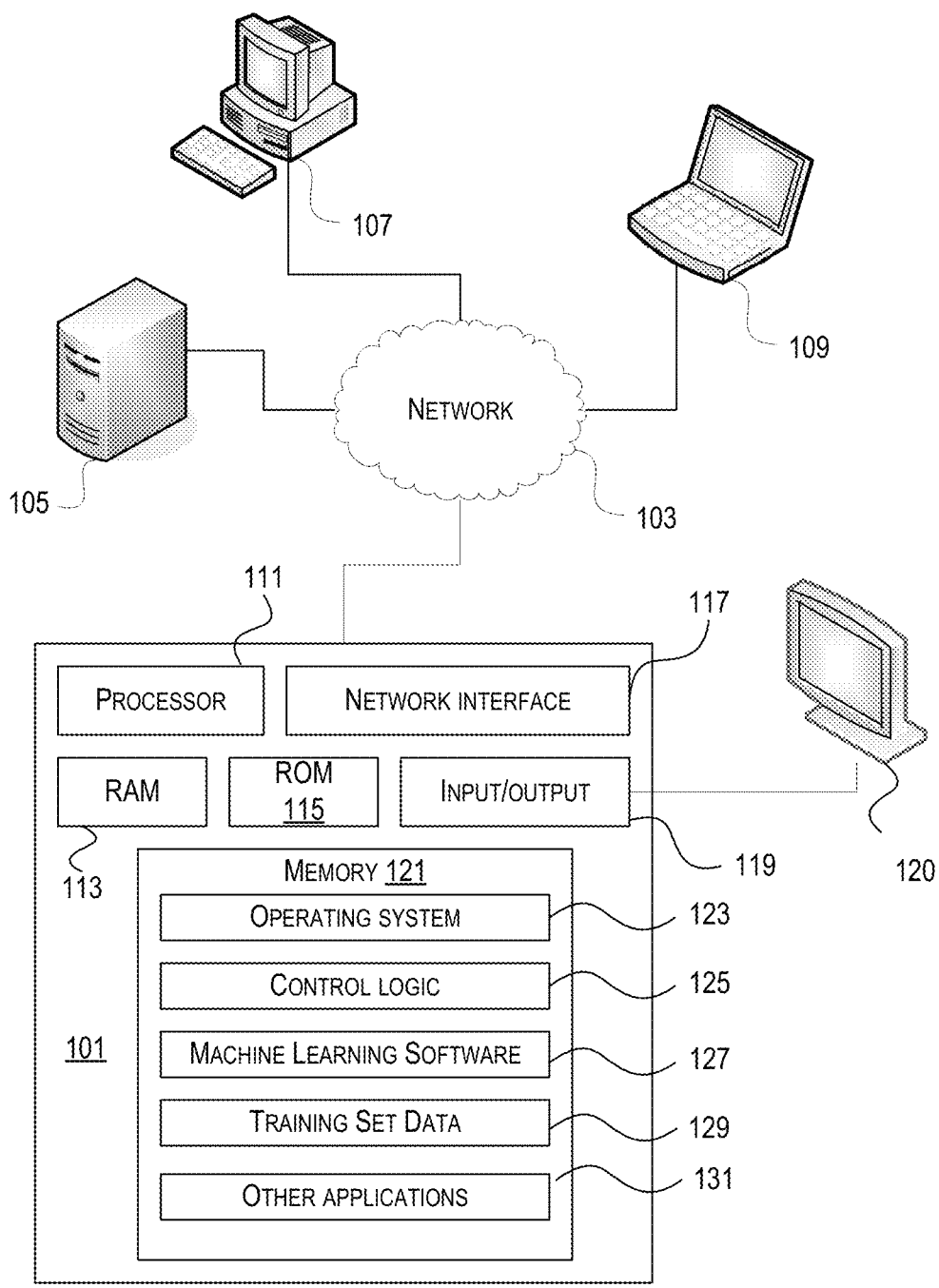
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may include favorite merchants or least favorite merchants to be presented to a user in an authentication question. These favorite merchants or least favorite merchants may be related to the user's transaction history, the user's spending pattern, the user's geographic location and demographic information, and the like. In this manner, authentication questions might be generated and presented in a manner which does not undesirably confuse users. For example, the favorite merchants or least favorable merchants may invoke a stronger impression from the user, comparing from random merchants that the user may shop occasionally. Including random merchants in the authentication question might make it difficult for a user to memorize the merchants. Conversely, certain merchants such as Amazon may be too common to be useful in the authentication question. Excluding common merchants may minimize guessability and promote security on the user account.

More particularly, some aspects described herein may provide for a computing device that may train a first machine learning model based on a frequency and a payment amount for a particular merchant. The computing device may determine favorite merchant information based on the frequency and the payment amount for the particular merchant associated with a user. Alternatively and/or additionally, the computing device may train the first machine learning model based on a spending pattern. The spending pattern may indicate a total expenditure on a payment card for a predetermined period of time. The computing device may determine the favorite merchant information based on the spending pattern.

In many aspects, the computing device may determine least favorite merchant information associated with the user based on the one or more transactions conducted by the user. The computing device may generate, based on the least favorite merchant information, the authentication question. The computing device may determine a geographic area associated with the user based on the one or more transactions conducted by the user. The computing device may generate the least favorite merchant information based on the geographic area. For example, the computing device may detect a merchant that is proximately located to the user based on the user's geographic area. The computing device may further detect that the user has not conducted any transaction with the merchant based on the one or more transactions conducted by the user. As such, the computing device may generate the least favorite merchant information comprising the merchant.

The computing device may train a second machine learning model with a scoring matrix associated the favorite merchant information. The trained second machine learning model may generate an output including authentication data indicating whether to provide the user device access to an account. The computing device may provide, as input to the trained second machine learning model, the response to the authentication question. The computing device may receive, from the trained second machine learning model and based on the scoring matrix, authentication data to determine whether to provide the user device access to the account. The second machine learning model may determine a likelihood that the user will correctly identify each merchant comprised in the favorite merchant information. The second machine learning model may assign, based on the likelihood, a weight factor associated with each merchant comprised in the favorite merchant information. The computing device may provide, based on the response to the authentication question and the weight factor, the user device access to the account.

Aspects described herein improve the functioning of computers by improving the accuracy and security of computer-implemented authentication processes. The steps described herein recite improvements to computer-implemented authentication processes, and in particular improve the accuracy and utility of authentication questions used to provide access to computing resources. This is a problem specific to computer-implemented authentication processes, and the processes described herein could not be performed in the human mind (and/or, e.g., with pen and paper). For example, as will be described in further detail below, the processes described herein rely on the processing of transaction data, the dynamic computer-implemented generation of authentication questions, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
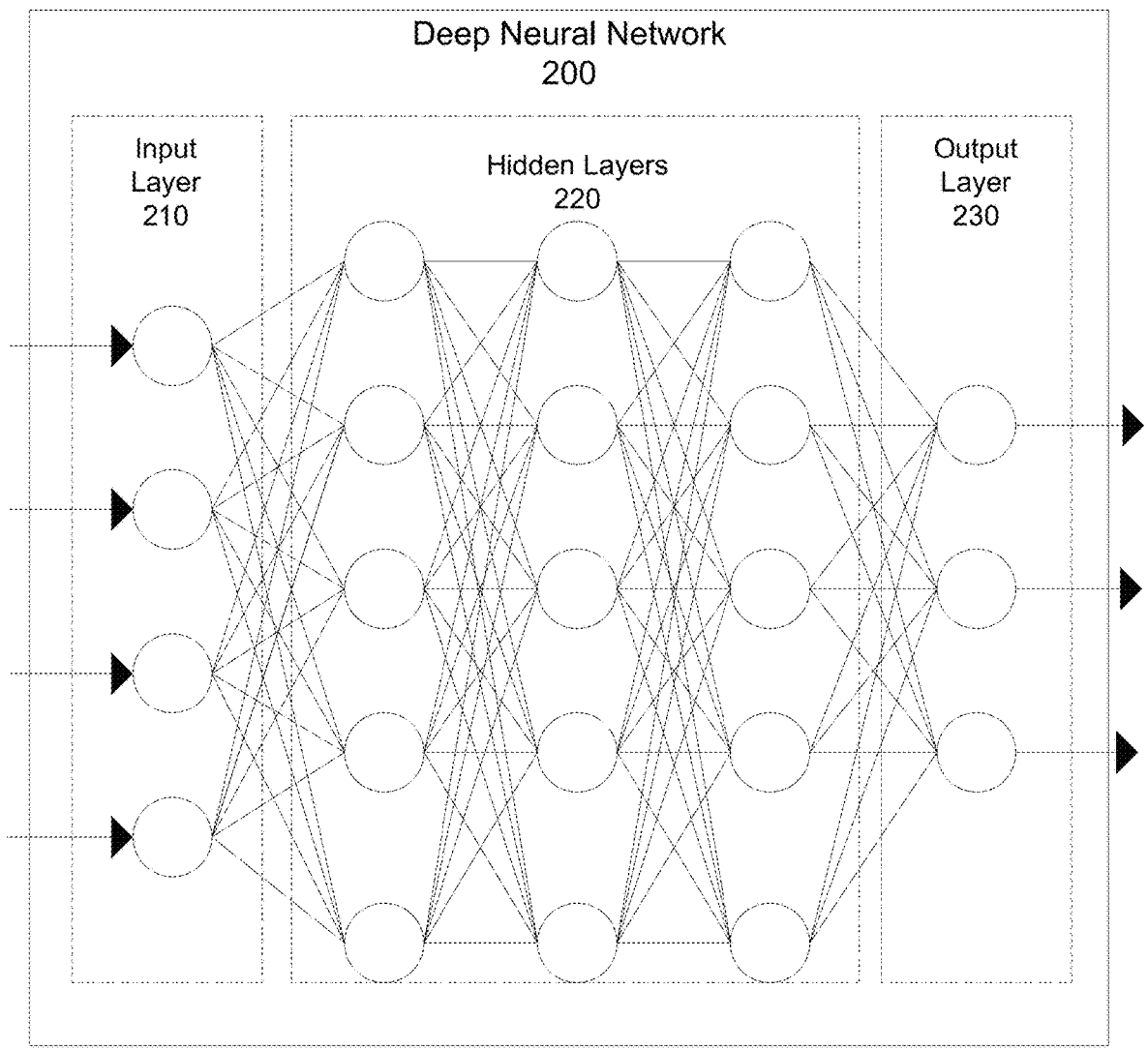
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
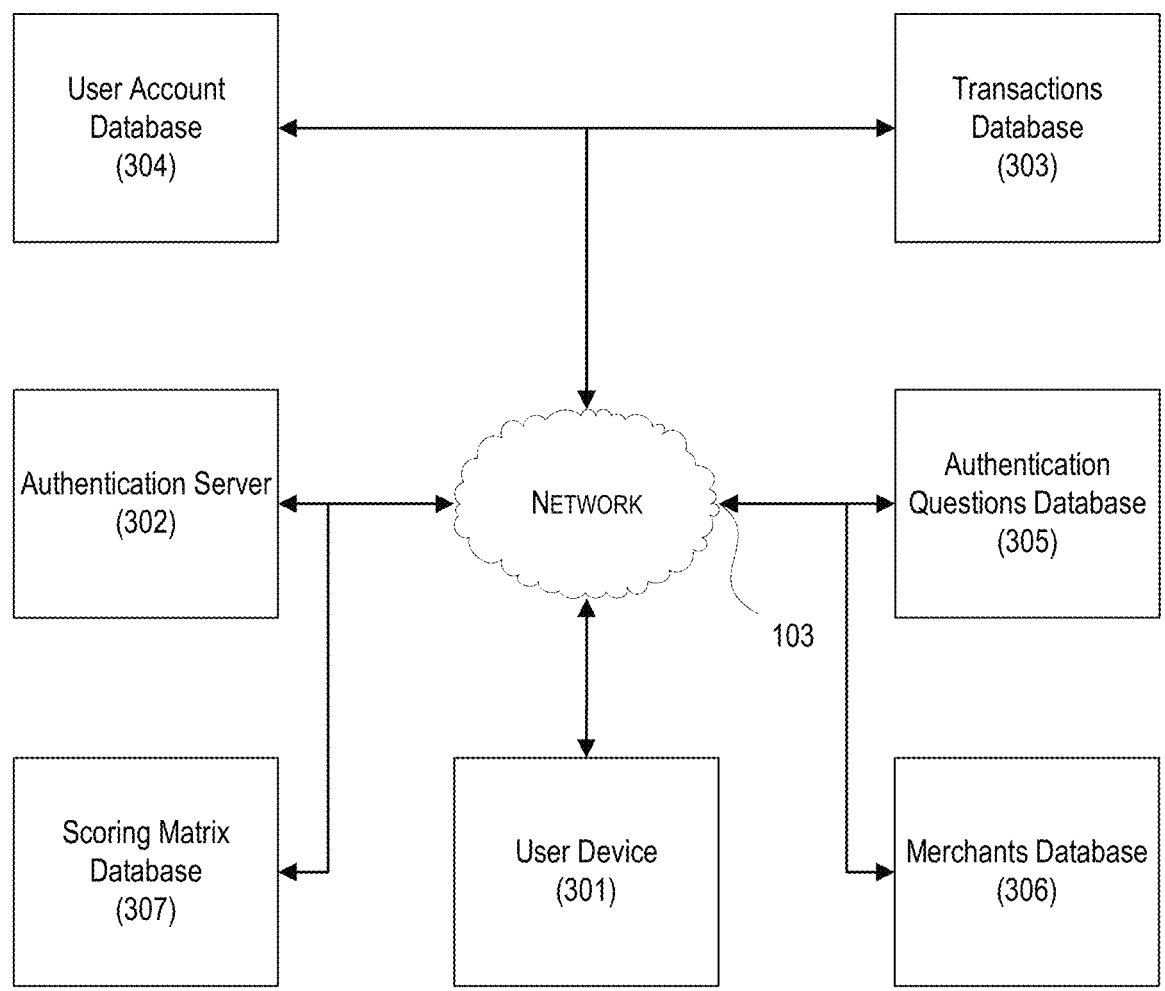
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, a merchants database 306 and a scoring matrix database 307. The network 103 may be the same or similar as the network 103 of FIG. 1. Each of the user device 301, the authentication server 302, the transactions database 303, the user account database 304, the authentication questions database 305, the merchants database 306, and/or the scoring matrix database 307 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access a website associated with the authentication server 302, and the user device 301 might provide (e.g., over the Internet and by filling out an online form) candidate authentication credentials to that website. The authentication server 302 may then determine whether the authentication credentials are valid. For example, the authentication server 302 might compare the candidate authentication credentials received from the user device 301 with authentication credentials stored by the user account database 304. In the case where the communication is telephonic, the user device 301 need not be a computing device, but might be, e.g., a conventional telephone.

The user account database 304 may store information about one or more user accounts, such as a username, password, demographic data about a user of the account, a geographic location of the user, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as their age, gender, location, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. The data stored by the transactions database 303 might be related to a frequency and a payment amount for a particular merchant from a user. The data stored by the transactions database 303 might be related to a total expenditure on a payment card for a predetermined period of time.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on transaction information (e.g., from the user account database 304 and/or the transactions database 303). The authentication questions database 305 might additionally and/or alternatively comprise one or more static authentication questions, such as an authentication question that is used for a wide variety of users (e.g., "What is your account number?"). An authentication question might correspond to a transaction occurred or not occurred in the past. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. Straightforward questions that should be easily answered by a user (e.g., "What is your mother's maiden name?") might be considered easy questions, whereas complicated answers that require a user to remember past transactions (e.g., "How much did you spend on coffee yesterday?") might be considered difficult questions. The authentication questions stored in the authentication questions database 305 may be associated with varying levels of memorability and guessability. Including one or more favorite merchants or least favorite merchants in the authentication questions may promote memorability, given that a user may have a strong impression on a favorite merchant or a least favorite merchant. Excluding certain common merchants (e.g., Amazon) that many users frequent may minimize guessability and increase the security of the user accounts.

The merchants database 306 might store data relating to one or more merchants, including the favorite merchants and least favorite merchants for the users. The merchants database 306 may be a merchant database that stores enterprise merchant intelligence records, which may in turn include a merchant identifier, a friendly merchant name, a zip code, a physical address, a phone number, an email or other contact information of the merchants, or a merchant category code (MCC). A MCC may be a four-digit number listed in ISO 18245 for retail financial services and used to classify a business by the types of goods or services it provides. MCCs may be assigned either by merchant type (e.g., one for hotels, one for office supply stores, etc.) or by merchant name. For example, grocery stores are classified as MCC 5411, "Grocery Stores, Supermarket," convenient stores are classified as MCC No. 5499, "MISC Food Stores—Default," car dealers are classified as MCC No. 5511, "Car & Truck Dealers/New/Used." The merchant records may be collected from public resources or merchant reported records.

A financial organization may build a proprietary version of the merchants database 306, for example, based on an aggregation of transaction records in transactions database 303. As a transaction arrives from a transaction stream, the corresponding transaction record may be processed, cleaned, and/or enhanced with a variety of services. For example, when a financial institution receives the transaction information in a transaction stream, the transaction information may be in the form of a line of data that offers limited information about the transaction, with each piece of information appearing in certain locations within the line of data. The merchant identifier may appear in a specific location and may include 8-10 characters in the abbreviated form, which might not be readily recognizable as a meaningful merchant name, particularly for small business merchants. The financial institution may process this abbreviated merchant identifier and convert it into a meaningful merchant name in a human readable format, and store it in the merchants database 306.

A financial organization may use a third-party API to gather merchant information, such as a merchant address or contact information, to be stored in the merchants database 306. A financial organization may maintain more static merchant information, such as a merchant identifier and MCC, in its proprietary the merchants database 306. A financial institution may use the third-party API to get merchant address, merchant social media handle, or other merchant information that may change over time.

The data stored by the merchants database 306 might be used to generate authentication questions that comprise both correct answers (e.g., based on data from the transactions database 303 indicating a user's one or more favorite merchants) and false answers (e.g., based on data from the merchants database 306, which might be randomly-selected merchants where a user has not or rarely conducted a transaction). For example, a computing device may receive from merchants database 306 indications (e.g., merchant names, merchant identifiers) of different merchants. The computing device may further receive transaction data from transaction database 303 indicating one or more transactions conducted by a user. The computing device may use the transaction data to train a machine learning model to determine data indicating favorite merchant information associated with a user. As such, an authentication question may be generated based on the favorite merchant information. The computing device may select a merchant category (e.g., MCC 5411 for grocery stores) for the authentication question. Based on the favorite merchant information and the merchant category, the computing device may generate the authentication question including favorite merchants in the merchant category of grocery stores, such as Realfoods, Joe's Grocery, Jill's Organic Market, etc.

The scoring matrix database 307 may store data corresponding to rules or criteria related to the candidate merchants in an authentication question. The scoring matrix may include a score assigned to each candidate merchant in the authentication question. The computing device may determine a likelihood that a user will correctly identify each candidate merchant in the authentication question. A score may be assigned to a candidate merchant in the authentication based on the likelihood that the user would get a question about the candidate merchant correct. For example, if the user has 99% chance that she should get the right answer for the first candidate merchant, while she has 80% chance to get the right answer for the second candidate right, the first candidate merchant may be assigned a larger weight factor than that of the second candidate merchant.

The computing device may assign a score to a candidate merchant in the authentication presented to a user based on a transaction amount, a transaction timestamp, or a frequency of visit associated with the candidate merchant. If the user shops at a merchant more frequently and has a larger purchase amount, the merchant may be assigned with a higher score. Likewise, if the user shops at a first merchant more recently than the second merchant, the first merchant may be assigned a higher score than the second merchant. The scoring matrix may also be determined based on different period of times or different security levels. For example, if recent hacking attempts have been detected on the account, the rules or criteria may require a higher score to access the account.

The computing device may train a second machine learning model with the appropriate scoring matrix. For example, the second machine learning model may adjust the weight assigned to each candidate merchant, so that the true user would get the answer right and pass the authentication question. After several iterations, the second machine leaning model may be trained with the appropriate scoring matrix. The computing device may provide, as input to the second machine learning model, a response to the authentication question from the user. The computing device may receive, from the trained second machine learning model and based on the scoring matrix, authentication data to determine whether to provide the user device access to the account. The trained second machine model may determine whether to grant the access of the account based on the aggregated score on the candidate merchants.

Having discussed several examples of computing devices which may be used to implement some aspects as discussed further below, discussion will now turn to a method for presenting favorite merchant selections in transaction-based authentication.

Figure 4:
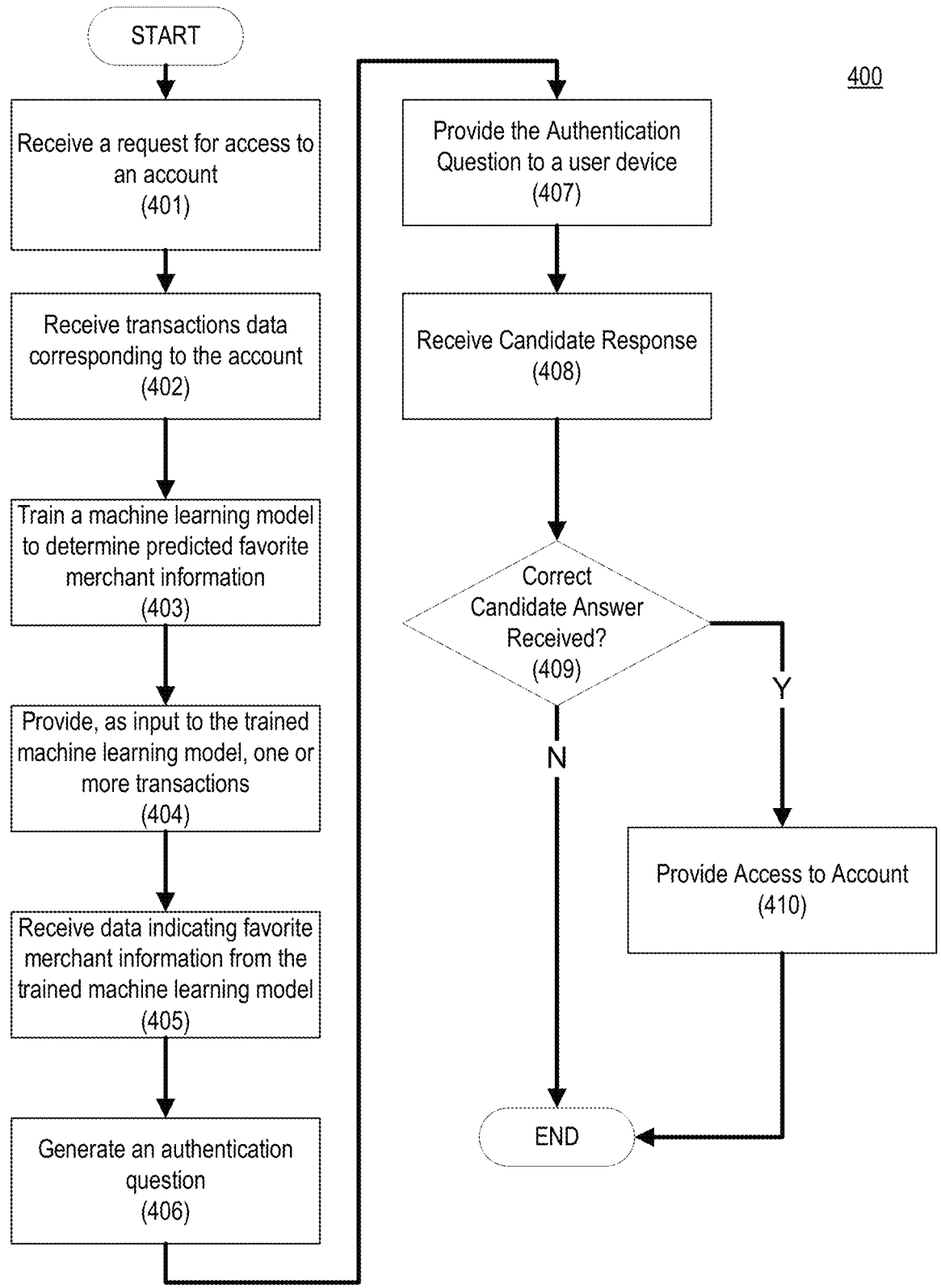
FIG. 4 depicts a flow chart comprising steps which may be performed for presenting favorite merchant selections in transaction-based authentication.

FIG. 4 illustrates an example method 400 for presenting favorite merchant selections in transaction-based authentication in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, a computing device (e.g., authentication server 302) may receive, from a user device, a request for access to an account associated with a user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

In step 402, the computing device may receive, from a transactions database, transactions data corresponding to the account, and the transactions data may indicate one or more transactions conducted by the user. The transaction data may be received from, e.g., the transactions database 303. For example, the transactions data may comprise transaction data related to purchases of goods and/or services made by a user. The transactions data might correspond to a period of time, such as a recent period of time (e.g., the last two months, the last four months, or the like). For example, the transaction data may indicate that the user conducted one or more transactions with Realfoods in the last week.

In step 403, the computing device may train a first machine learning model to determine predicted favorite merchant information associated with a plurality of different users. The first machine learning model (e.g., as implemented via the deep neural network 200 and/or the machine learning software 127) may be trained using a history of transaction records by the plurality of different users. For example, the transaction records may indicate a frequency and a payment amount for a particular merchant from a user. To train the machine learning model in this manner, the machine learning model may be provided frequencies and payment amounts for various transactions conducted by the plurality of different users. For example, the computing device may process the transaction records and extract the corresponding frequencies and payment accounts for each of the plurality of users. To train the machine learning model, the first machine learning model may also be provided with spending patterns associated with different users. For example, the computing device may process the transaction records and extract a total expenditure on a payment card (e.g., a credit card) made by a user for a predetermined period of time (e.g., the last month). Based on the frequencies, payment amounts and other spending patterns, the first machine learning model may be trained to determine predicted favorite merchant information associated with these different users. For example, the first machine learning model may be trained to determine that a first set of users have a favorite merchant Joe's Grocery, where each of these users may shop at Joe's Grocery once a week with a payment amount ranging from $200 to $400. The first machine learning model may be trained to determine that a second set of users have a favorite merchant Jill's Organic Market, where each of these users may shop at Jill's Organic Market 1.5 times a week with a payment amount ranging from $50 to $200.

The first machine learning model may be trained to recognize that the favorite merchants need not always align with frequencies of visits. For example, a user may visit a particular fast food restaurant quite frequently. However, that fast food restaurant might not be the user's favorite, and the user goes there due to convenience. Indeed, the user may prefer a steak restaurant, but only visits there occasionally due to affordability. The first machine learning model may be trained to recognize that the user goes to the steak restaurant more frequently than other regular customers (e.g., 40-50 other customers who have visited the restaurant in the last year). So even though the user only has an expenditure on her credit card once a month for the steak restaurant, this may be indicative that the particular steak restaurant is potentially one of the user's favorites.

The first machine learning model may be trained based on a combination of frequencies and total expenditure related to a merchant. In some recurrent payments, a total expenditure over a period of time may be indicative of a favorite. In another example, a user may attend a sport event infrequently. If the user spends $400 on the purchase of ticket each time, and the user had three such expenditures through the course of a year, the total expenditure of $1200 may be indicative that this sport event may be the user's favorite, because the user spends a large sum of money and also with frequency. However, the concept of a large expenditure is relative to the user. For example, if a user regularly charges $5-10K on one of the credit cards, $1200 might not necessarily as indicative of her favorite. On the other hand, if the user has a total $10K expenditure on a credit card in the last year, the fact that the user spends $1,200 at a single merchant may be quite indicative of her favorite. As such, the first machine learning model may also factor in the total amount of expenditure on one or more credit cards for this user in a given period: last year.

The first machine learning model may be trained to determine predicted least favorite merchant information associated with these different users based on transaction records such as the frequencies, payment amounts, and other spending patterns. For example, the first machine learning model may be trained to determine that a third set of users have a least favorite merchant, where each of these users may shop at that merchant once every three months or less with a payment amount ranging from $20 to $100. The first machine learning model may additionally and/or alternatively be trained to determine that a fourth set of users have a least favorite merchant, where each of these users may shop at the least favorite merchant once every six months or less with a payment amount ranging from $10 to $100. These least favorite merchants may promote memorability, if they are presented in the authentication questions with the favorite merchants. Due to the fact that a user may tend to have strong impression on her least favorite merchants, her favorite merchants and the contrast between these two groups of merchants, it is more likely for the user to identify the favorite merchants or least favorite merchants if she sees both groups of merchants in the authentication questions.

In training the first machine learning to determine predicted least favorite merchant information, the computing device may use additional training data such as a geographic location of a user. For example, the computing device may receive a physical address of a merchant from the merchants database 306. The computing device may receive the geographic location information of the user from user account database 304. Such information may include a city, a street or an address of the user, a zip code, or a GPS coordinate of a user device, etc. The computing device may determine a geographic area associated with the user. The first machine learning model may be provided with addresses of various merchants and geographic locations associated with different users. Based on the physical address of the merchants and the geographic areas of different users, the first machine learning model may be trained to determine predicted least favorite merchant information associated with different users, particularly the users whose geographic areas are proximately located to the merchants. In this manner, the least favorite merchants may be excluded from users who do not shop on the merchants because the merchant locations are not convenient for the users. For example, the first machine learning model may be trained to determine that in the third set of users who have been initially identified with a least favorite merchant Realfoods, each of these users may shop at Realfoods once every three months or less with a payment amount ranging from $20 to $100. The first machine learning model may determine that in the third set of users, a first subset of users do not visit or rarely visit Realfoods, because Realfoods is not proximately located near these users. The first machine learning model may determine that in the third set of users, a second subset of users do not or rarely visit Realfoods in the last three month, and Realfoods is proximately located near the users. As such, Realfoods may be removed from a list of least favorite merchants from that of the first subset of users. Conversely, presenting Realfoods as one of the least favorite merchants may be more meaningful and memorable to the second subset of users, given that they intentionally choose not to visit Realfoods, not out of inconvenience.

The first machine learning model may be trained to recognize predicted favorite merchants or predicted least favorite merchants based on similarity. For example, the first machine learning model may take additional input as training data, such as MCCs of the merchants, their geographic locations, the price ranges, other subcategories of the merchants. For example, the first machine learning model may place Realfoods, Joe's Grocery, Jill's Organic Market, Grand's, and Fredmans in a same cluster based on the common MCC (e.g., MCC 5411 for grocery stores) shared by these merchants. The first machine learning model may place Realfoods, Joe's Grocery, Jill's Organic Market and Grand's in a same cluster based on the common MCC and the fact that these merchants are in the similar price range. The price range may be relevant to the spending patterns of the users such as a total payment amount for each transaction. The first machine learning model may place Realfoods, Joe's Grocery, Jill's Organic Market in a same cluster based on the common MCC and the fact that these merchants are labelled as organic grocery stores. The first machine learning model may place Realfoods, Joe's Grocery, Jill's Organic Market, and Grand's in a same cluster based on the common MCC and the fact that these merchants are located in a common geographic area (e.g., within 10-mile radius). The first machine learning model may place Realfoods, Joe's Grocery, Jill's Organic Market, Grand's, Sureway, and Fredmans in a same cluster due to the fact that these merchants offer grocery delivery service, although they are not located within the 10-mile radius from each other.

Figure 5A:
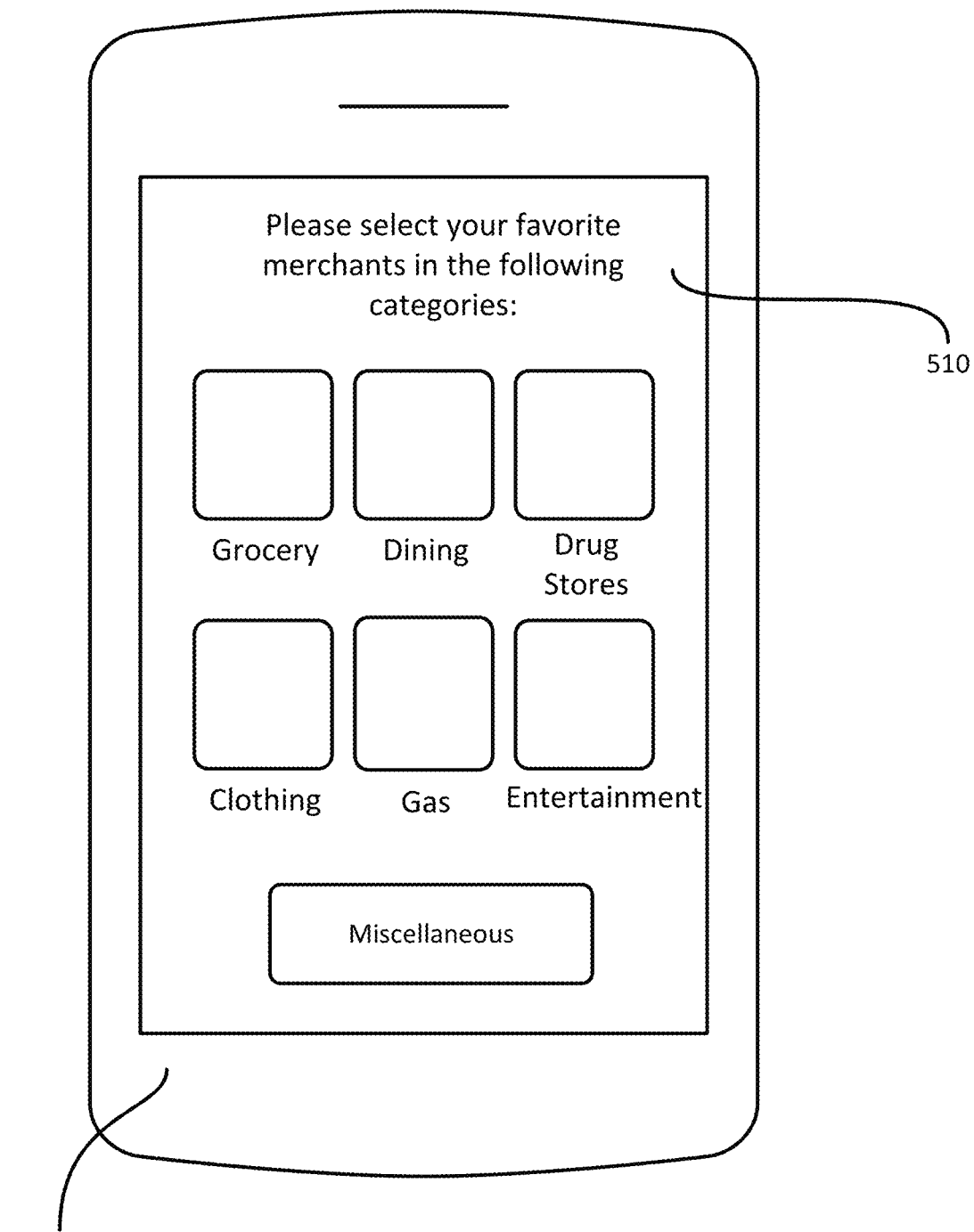
FIG. 5A depicts an example interface for a user to configure favorite merchants.
Figure 5B:
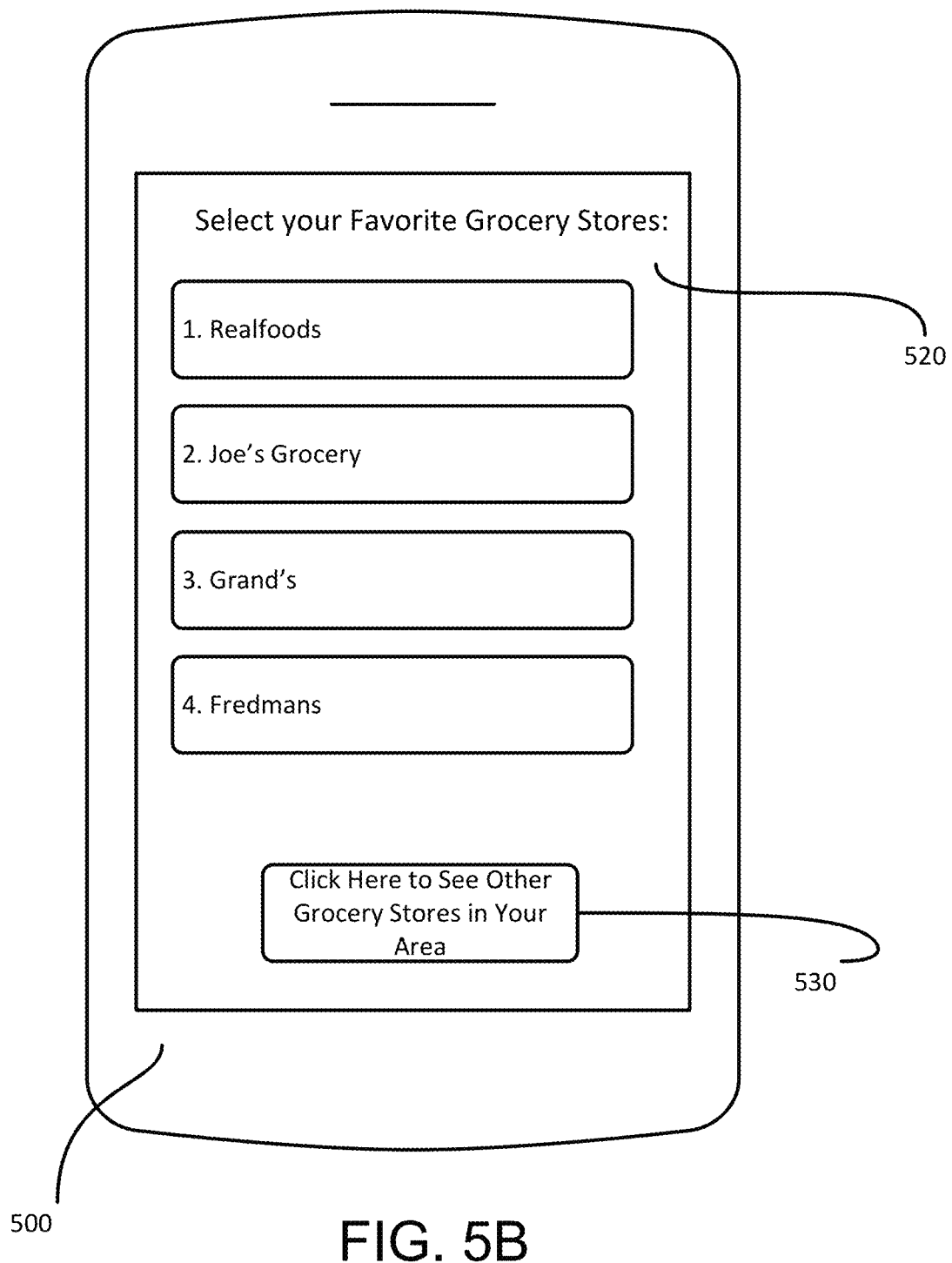
FIG. 5B depicts another example interface for a user to configure favorite merchants.

The first machine learning model may be trained using feedback from users. FIGS. 5A-B depict example interfaces for a user to configure favorite merchants. As illustrated in FIG. 5A, the computing device may present to a user an interface 510 on a user device 500 with a list of merchant categories, for example, the merchant categories of grocery, dining, drug stores, clothing, gas, entertainment, miscellaneous, etc. The merchant categories may correspond to the MCCs or subcategories of the merchants. The merchant categories may be defined by the computing device based on similarities of the merchants in a group. The user may select a merchant category (e.g., grocery) to configure the favorite merchants in that category. FIG. 5B presents an interface 520 after the user select a merchant category of grocery. The computing device may initially recommend a list of favorite merchants based on the transaction records of the users. For example, the computing device may present the most frequent merchants the user has transacted with in this category in the last year. The user may select one or more merchants, for example, Realfoods, Joe's Grocery, Grand's and Fredmans, as her favorite merchants. The computing device may receive a response from the user for a selection of a merchant (e.g., Fredmans) as one of the favorite merchants. In one example, Fredmans may be one of the merchants that the user has frequented in the last year. In another example, the transaction records may indicate that this user rarely shops at Fredmans. The computing device may determine that the user rarely shops at Fredmans, because the merchant is outside the geographic location of the user, even though Fredmans is one of her favorite grocery stores. The computing device may ask a user to provide a reason (not shown in FIG. 5B) why the user rarely shops at the Fredmans. Likewise, the computing device may provide a list of least favorite merchants for the user to choose from. The least favorite merchants may be initially based on the transaction records. The computing device may provide the user feedback as training data to train the first machine learning model.

In step 404, the computing device may provide, as input to the trained first machine learning model, the one or more transactions conducted by the user. The input to the trained first machine learning model may include transaction data related to one or more transactions conducted by the user, such as frequencies and payment amount for merchants in the previous transactions, a transaction pattern comprising a total expenditure on a payment card for a predetermined period of time, etc. The input to the trained first machine learning model may include merchant information that the user has transacted with, such as MCCs, geographic locations of the merchants, etc. The input to the trained first machine learning model may also include demographic data about the user such as age, gender, location, occupation, education level, income level, etc.

In step 405, the computing device may receive, from the trained first machine learning model, data indicating favorite merchant information associated with the user. Based on the transaction data, the merchant information and the user demographic information, the trained first machine learning model may generate favorite merchant information including one or more favorite merchants or least favorite merchant information including one or more least favorite merchants. For example, each favorite merchant or least favorite merchant may be associated with a confidence score. The trained first machine model may generate a list of favorite merchants, where each merchant is associated with a confidence score above a threshold value (e.g., 95%). The trained first machine model may generate a list of least favorite merchants, where each merchant is associated with a confidence score above a threshold value (e.g., 95%). The computing device may modify a list of least favorite merchants generated by the trained machine learning model. For example, the user may provide a selection (e.g., interface 520 in FIG. 5B) or an input field on a webpage to identify some favorite merchants. The computing device may receive the user selection and add these favorite merchants (e.g. Mike's Shoes) to the list of favorite merchants, even if the user has never shopped at the indicated favorite merchant to reflect the user's preferences more faithfully. Likewise, the computing device may modify a list of favorite merchants generated by the first trained machine learning model based on the user feedback. The trained first machine model may apply the same or different threshold values in generating the list of the favorite merchants and the list of least favorite merchants. For example, a lower threshold value (e.g., 90%) may be applied to the list of the least favorite merchants, where this list may be further based on, for example, an income level of the user. Certain merchants (e.g., Mike's Shoes) may be removed from the list of the least favorite merchants for that user, given that the user might not shop at the merchant due to economic reasons. Removal of such merchant may facilitate memorability, reduce confusions and promote accessibility to the user account.

In step 406, the computing device may generate, based on the favorite merchant information, an authentication question. The authentication question may be generated based on a list of favorite merchants. The authentication question may ask a user, for example, to select one or more favorite merchants from a list of candidate merchants. The candidate merchants may include, for example, three merchants from the list of favorite merchants associated with the user, and one merchant that the user never or rarely shops with, or occasionally shops with, based on the user's transaction history. The authentication question may be generated based on a list of least favorite merchants. The authentication question may ask a user, for example, to select one or more least favorite merchants from a list of candidate merchants. The candidate merchants may include, for example, three merchants from the list of least favorite merchants associated with the user, and one merchant that the user has shopped numerous times based on the user's transaction history. The authentication question may be generated based on both a list of favorite merchants and a list of least favorite merchants. The authentication question may ask a user to select one or more favorite merchants from a list of candidate merchants. The candidate merchants may include, for example, three favorite merchants from the list of favorite merchants associated with the user, and one merchant from the list of least favorite merchants. Using candidate merchants from both the list of favorite merchants and the list of least favorite merchants may reduce the likelihood of confusion and promote memorability, as the user may have a strong impression on her favorite and least favorite merchants.

The authentication question may include candidate merchants from similar MCCs, subcategories, or price ranges, etc. For example, the authentication question may include Realfoods, Joe's Grocery, Jill's Organic Market, and Fredmans, which are the grocery stores in the similar price range. The authentication question may include candidate merchants from different MCCs, subcategories or price range, etc. For example, the authentication question may include Grand's, Mike's Shoes, Garden Restaurant, and Premium Department Store. In some examples, using candidate merchants from similar MCCs, subcategories or price ranges may promote memorability.

In step 407, the computing device may present the authentication question. Presenting the authentication question may comprise causing one or more computing devices to display and/or otherwise output the authentication question. For example, the computing device may cause presentation, to the user, of the authentication question. Such presentation might comprise providing the authentication question in a text format (e.g., in text on a website), in an audio format (e.g., over a telephone call), or the like.

In step 408, the computing device may receive a candidate response to the authentication question. A candidate response may be any indication of a response, by a user, to the authentication question presented in step 407. For example, where an authentication question comprises one or more candidate merchants, the candidate response might comprise a selection of one or more favorite merchants or least favorite merchants. As another example, in the case of a telephone call, the candidate response might comprise an oral response to an authentication question provided using a text-to-speech system over the call.

In step 409, the computing device may determine whether the candidate answer received in step 408 is correct. Determining whether the candidate answer is correct may comprise comparing the answer to the correct answer determined as part of generating the authentication question in step 406. If the candidate answer is correct, the method 400 proceeds to step 410. Otherwise, the method 400 ends.

The computing device may train a second machine learning model with a scoring matrix associated with each candidate merchant in the authentication question. The second machine learning model may use a set of candidate merchants in various authentication questions and a set of answers from different users as training data. The second machine learning model may generate a scoring matrix based on the training data. The second machine learning model may generate an output indicating whether the user may pass the authentication question. The scoring matrix may be based on a likelihood that the user will correctly identify each candidate merchant in the authentication questions. As part of the training process, the second machine learning model may calculate how likely or frequently a true user would get the answer right for each candidate merchant in the authentication question. Based on this calculation, the second machine learning model may adjust the weight for each candidate merchant. For example, if there is 99% chance that the true user would get an answer right for a first candidate merchant, while there is 80% chance that the true user would get an answer right for a second candidate merchant, the first candidate merchant may be weighed more heavily than the second candidate merchant. As such, the second machine learning model may assign, based on the likelihood, a weight factor associated with each candidate merchant and determine the scoring matrix. The second machine learning model may go through several iterations to assign different weights to different candidate merchants. The second machine learning model may be trained with the appropriate weight factors for the candidate merchant in the scoring matrix. The computing device may provide, as input to the trained second machine learning model, the response from the particular user to the authentication question. The computing device may receive, from the trained second machine learning model and based on the scoring matrix, authentication data to determine whether to provide the user device access to the account.

In step 410, the computing device may provide access to the account. For example, the computing device may provide, based on the candidate response, the user device access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like. In some examples, the computing device may provide the user access to the account when the candidate response is, for example, 100% accurate. Alternatively, or additionally, the computing device may provide the user access to the account based on a score generated using the scoring matrix reaching a threshold value (e.g., above 60 points).

Figure 6B:
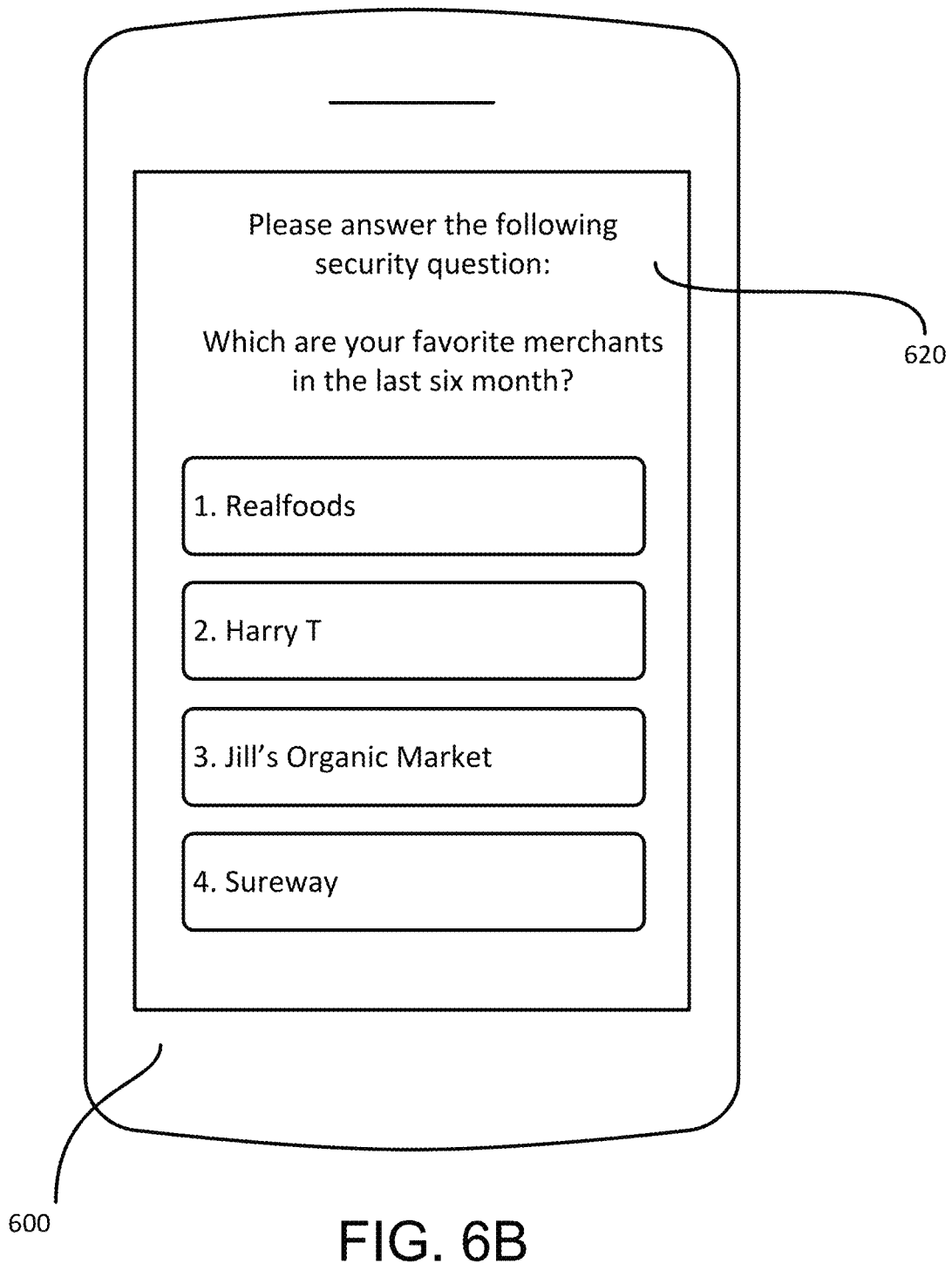
FIG. 6B depicts an example of an authentication question that may be presented to a user.

FIGS. 6A-B illustrate an example of generating an authentication question that may be presented to a user. The elements in FIGS. 6A-B are representations of various steps in the method 400 depicted in FIG. 4, such as those depicted with respect to steps 405 through 408 of the method 400. As illustrated in FIG. 6A, a machine learning model (e.g., the trained first machine learning model in FIG. 4) may determine a list of favorite merchants 601 for a user in a predetermined time period, e.g. the six-month timeframe from January to June. The favorite merchant list 601 may include Realfoods, Joe's Grocery, Fredmans, and Sureway. The machine learning model may also may determine a list of least favorite merchants 602 for the user in the same timeframe, including Jill's Organic Market, Alldee, Harry T, and Grand's. The authentication question 620 may be generated and presented on user device 600 in FIG. 6B based on the described herein for reducing confusion of the user and increasing memorability with respect to presented true or false answer choices. For purposes of illustration, the authentication question 620 is illustrated as an authentication question based on favorite merchants 601 and least favorite merchants 602 in FIG. 6A. In this example, the authentication question 620 may include both favorite merchants and least favorite merchants of the user, and the computing device may present the authentication question 620 to the user. Given that the user may tend to have a strong impression on the favorite merchants or least favorite merchants, the authentication question 620 may be less confusing to the user, thereby increasing the likelihood that the user answers the authentication question 620 correctly. Although the authentication question is generated based on both favorite merchants 601 and least favorite merchants 602, it is possible to generate the authentication question based on favorite merchants 601 alone or least favorite merchants 602 alone. The authentication questions may also include one or more candidate merchants that are not a merchant from favorite merchants 601 or least favorite merchants 602.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors, cause the computing device to:
receive, from a user device, a request for access to an account associated with a user;
provide, as input to a first machine learning model, transaction data associated with one or more transactions conducted by the user;

receive, from the first machine learning model, data indicating favorite merchant information associated with the user;

determine, based on the one or more transactions conducted by the user, additional data indicating least favorite merchant information associated with the user and a geographic area associated with the user;

generate the least favorite merchant information based on the additional data and the geographic area;

generate, based on the favorite merchant information and the least favorite merchant information, an authentication question; and provide, based on a response to the authentication question and to the user device, access to the account.

2. The computing device of claim 1, wherein the instructions, when executed by the one or more processors, cause the computing device to determine the least favorite merchant information associated with the user by:

receiving, from the first machine learning model, the additional data indicating the least favorite merchant information associated with the user.

3. The computing device of claim 1, wherein the instructions, when executed by the one or more processors, cause the computing device to:

train, based on training transaction records by a plurality of users, the first machine learning model to determine predicted least favorite merchant information associated with the plurality of users.

4. The computing device of claim 1, wherein the instructions, when executed by the one or more processors, cause the computing device to:

train, based on training transaction records by a plurality of users, the first machine learning model to determine predicted favorite merchant information associated with the plurality of users.

5. The computing device of claim 4, wherein the training transaction records comprise frequencies, payment amounts and merchants for training transactions associated with the plurality of users.

6. The computing device of claim 4, wherein the training transaction records comprise spending patterns for training transactions associated with the plurality of users.

7. The computing device of claim 1, wherein the instructions, when executed by the one or more processors, cause the computing device to:

detect, based on the geographic area, a merchant that is proximately located to the user;

determine, based on the one or more transactions conducted by the user, that the user has not conducted any transaction with the merchant; and generate the least favorite merchant information comprising the merchant.

8. The computing device of claim 1, wherein the instructions, when executed by the one or more processors, cause the computing device to:

select a merchant category for the authentication question; and generate, based on the favorite merchant information and the merchant category, the authentication question, wherein the authentication question comprises favorite merchants in the merchant category.

9. The computing device of claim 1, wherein the instructions, when executed by the one or more processors, cause the computing device to:

provide, to the user device, the authentication question; and receive, from the user device, a response to the authentication question.

10. The computing device of claim 1, wherein the instructions, when executed by the one or more processors, cause the computing device to:

train a second machine learning model with a scoring matrix associated with the favorite merchant information;

provide, as input to the trained second machine learning model, a response to the authentication question; and receive, from the trained second machine learning model and based on the scoring matrix, authentication data to determine whether to provide the user device access to the account.

11. The computing device of claim 1, wherein the instructions, when executed by the one or more processors, cause the computing device to:

determine a likelihood that the user will correctly identify each merchant comprised in the favorite merchant information;

assign, based on the likelihood, a weight factor associated with each merchant comprised in the favorite merchant information; and provide, based on a response to the authentication question and the weight factor, the user device access to the account.

12. A method comprising:

receiving, by a computing device and from a user device, a request for access to an account associated with a user;

providing, as input to a first machine learning model, transaction data associated with one or more transactions conducted by the user;

receiving, from the first machine learning model, data indicating favorite merchant information associated with the user;

determining, by the computing device and based on the one or more transactions conducted by the user, additional data indicating least favorite merchant information associated with the user and a geographic area associated with the user;

generating the least favorite merchant information based on the additional data and the geographic area;

generating, by the computing device and based on the favorite merchant information and the least favorite merchant information, an authentication question; and providing, by the computing device and based on a response to the authentication question and to the user device, access to the account.

13. The method of claim 12, wherein determining the least favorite merchant information associated with the user comprises:

receiving, from the first machine learning model, the additional data indicating the favorite merchant information associated with the user.

14. The method of claim 12, further comprising:

training, based on training transaction records by a plurality of users, the first machine learning model to determine predicted least favorite merchant information associated with the plurality of users.

15. The method of claim 12, further comprising:

training, based on training transaction records by a plurality of users, the first machine learning model to determine predicted favorite merchant information associated with the plurality of users.

16. The method of claim 15, wherein the training transaction records comprise frequencies, payment amounts and merchants for training transactions associated with the plurality of users.

17. The method of claim 12, further comprising:
selecting a merchant category for the authentication question; and
generating, based on the favorite merchant information and the merchant category, the authentication question, wherein the authentication question comprises favorite merchants in the merchant category.

18. The method of claim 12, further comprising:
determining the favorite merchant information and the least favorite merchant information based on at least one of:
a frequency of transactions between the user and a particular merchant,
a payment amount associated with a transaction between the user and the particular merchant, or
a proximality of the particular merchant to the user.

19. One or more non-transitory computer-readable media storing instructions that, when executed by one or more processors, cause a computing device to:
receive, from a user device, a request for access to an account associated with a user;
provide, as input to a first machine learning model, transaction data associated with one or more transactions conducted by the user;
receive, from the first machine learning model, data indicating favorite merchant information associated with the user;
determine, based on the one or more transactions conducted by the user, additional data indicating least favorite merchant information associated with the user and a geographic area associated with the user;
generate the least favorite merchant information based on the additional data and the geographic area;
generate, based on the favorite merchant information and the least favorite merchant information, an authentication question; and
provide, based on a response to the authentication question and to the user device, access to the account.

20. The computer-readable media of claim 19, wherein the instructions, when executed by the one or more processors, cause the computing device to determine the least favorite merchant information associated with the user by:
receiving, from the first machine learning model, the additional data indicating the least favorite merchant information associated with the user.

* * * * *